United States Patent
Nathan et al.

(10) Patent No.: US 7,738,110 B2
(45) Date of Patent: Jun. 15, 2010

(54) DISPLACEMENT SENSOR BASED ON PHOTONIC CRYSTAL WAVEGUIDES

(75) Inventors: Menachem Nathan, Tel Aviv (IL); Ben Zion Steinberg, Kfar Saba (IL); Oren Levy, Shoham (IL); Amir Boag, Yavne (IL)

(73) Assignee: Ramot at Tel Aviv University Ltd., Tel Aviv (IL)

( * ) Notice: Subject to any disclaimer, the term of this patent is extended or adjusted under 35 U.S.C. 154(b) by 0 days.

(21) Appl. No.: 12/269,087

(22) Filed: Nov. 12, 2008

(65) Prior Publication Data

US 2009/0066964 A1    Mar. 12, 2009

Related U.S. Application Data

(62) Division of application No. 11/274,132, filed on Nov. 16, 2005, now Pat. No. 7,466,424.

(60) Provisional application No. 60/628,113, filed on Nov. 17, 2004.

(51) Int. Cl.
*G01B 9/02* (2006.01)
(52) U.S. Cl. .................................... 356/482
(58) Field of Classification Search ........... 356/482, 356/498, 505
See application file for complete search history.

(56) References Cited

U.S. PATENT DOCUMENTS

2002/0118941 A1*    8/2002    Notomi et al. .............. 385/129
2004/0021193 A1     2/2004    Nathan et al.
2004/0080726 A1     4/2004    Suh et al.

OTHER PUBLICATIONS

Ultra-low loss photonic integrated circuit with membrane-type photonic crystal waveguides, Nov. 3, 2003 / vol. 11, No. 22 / Optics Express 2927.*

Sensors and Actuators A vol. 69 (1998) pp. 134-138; Tingyun Wang et al.; "A High Precision Displacement Sensor Using A Low-Finesse Fiber-Optic Fabry-Perot Interferometer".

Review of Scientific Instruments vol. 70. No. 6 (Jun. 1999) pp. 2875-2879; Hossein Golnabi; "Design and Operation Of Different Optical Fiber Sensors For Displacement Measurements".

Applied Optics vol. 34, No. 34 (Dec. 1, 1995) Abdelrafik Malki et al.; "Optical Fiber Accelerometer Based on a Silicon Micromachined Cantilever".

(Continued)

*Primary Examiner*—Gregory J Toatley, Jr.
*Assistant Examiner*—Jonathon D Cook
(74) *Attorney, Agent, or Firm*—Mark M. Friedman

(57) ABSTRACT

A displacement sensor comprising at least one pair of coplanar photonic crystal waveguide (PCWG) sections aligned along or parallel to a common axis and separated by a gap, one PCWG section of a pair operative to perform a displacement relative to the other section of the pair. In some embodiments, the sensor is linear, comprising two PCWG sections separated by a gap that forms a cross PCWG, the displacement sensing performed preferably differentially between two edges of the cross PCWG. In other embodiments, the sensor includes Mach Zehnder Interferometer (MZI) configurations with gaps between fixed and moving PCWG sections. Displacement induced changes in the gap widths are reflected in changes in an output parameter of the MZI.

8 Claims, 14 Drawing Sheets

Complete device – MZI PCWG sensor

OTHER PUBLICATIONS

Optics Letters May 15, 2000/vol. 25, No. 10; Yong Xu et al.; "Adiabatic Coupling Between Conventional Dielectric Waveguides and Waveguides with Discrete Translational Symmetry".

Applied Physics Letters, vol. 86, 104102 (2005); O. Levy et al.; "Ultrasensitive Displacement Sensing Using Photonic Crystal Waveguides".

Journal of Lightwave Techonology, vol. 22, No. 2, Feb. 2004; Jae-Soong I et al.; "Optimal Design For One-Dimensional Photonic Crystal Waveguide".

Optics Express, vol. 27. No. 23—pp. 2079-2081 (Dec. 1, 2002); S. Nishikawa et al. ; "Optical Characterization of Photonic Crystal Delay Lines Based on One-Dimensional Coupled Defects".

Current Applied Physics.; vol. 4, pp. 245-249 (2004); Chi-.O. Cho et al.; "Towards Nano-Waveguides".

Physical Review B 68, 245117 (2003); Zhi-Yuam Li et al.; Application of Structural Symmetries in the Plane-Wave-Based Transfer-Matrix Method For Three Dimensional Photonic Crystal Waveguides.

IEEE Transaction on Antennas and Propagation ,vol. AP-35, No. 10, (Oct. 1987) pp. 1119-; Yehuda Levitan; "Analysis of Electromagnetic Scattering From Dielectric Cylinders Using A Multifilament Current Model".

Optics Express vol. 13, No. 8 (Apr. 18, 2005); 2931; Damiam Goldring et al."Anaylsis of Waveguide-Splitter-Junction in High-Index Silicon-On-Insulator Waveguides".

\* cited by examiner

SOI Wafer

Oxidation (b)

Front SiO$_2$ dry etch (c)

Back SiO$_2$ dry etch (d)

Formation of SU8 posts (e)

Front side Si dry etch (f)

Front side protection (g)

Backside Si dry etch (h)

Buried SiO$_2$ dry etch (i)

Cleaning (j)

Top view of fabricated PCWGs

Complete device – linear PCWG sensor (I)

a b c

DISPLACEMENT SENSOR BASED ON PHOTONIC CRYSTAL WAVEGUIDES

CROSS REFERENCE TO RELATED APPLICATIONS

The present application is a Continuation Application of U.S. patent application Ser. No. 11/274,132 filed Nov. 16, 2005, now allowed, which claims priority from U.S. Provisional Patent Applications No. 60/628,113 filed 17 Nov. 2004, the contents of which are incorporated herein by reference.

FIELD OF THE INVENTION

The present invention relates to optical displacement sensors and more specifically to optical displacement sensors based on photonic crystal (PC) waveguides.

BACKGROUND OF THE INVENTION

Displacement sensors are used extensively in a host of applications, from simple, straightforward extensiometers to measurement of acceleration, vibration or rotation (e.g. in gyroscopes).

Optical displacement sensors are known. They rely generally on the precise measurement of the micro-displacement of a sub-millimeter flexible component. The displacement is measured with optical techniques, which can be defined as either intensity- or interferometry-based [T. Wang, S. Zheng, and Z. Yang, Sensors and Actuators A 69, 134 (1998)]. Intensity modulation methods are commonly used, but provide inferior sensitivity relative to interferometry ones. Intensity modulation may be obtained by a relative movement between two optical fiber segments separated by a gap. The overlap area between the two segments determines the amount of energy transferred between the segments [H. Golnabi, Rev. Sci. Instrum, 70 2875 (1999)]. Such devices can provide a sensitivity of 1/90 [$\mu m^{-1}$] [M. Abdelrafik, L. Pierre, M. Jeanine, R. Christine, and F. Pierre, Appl. Optics 34, 8014 (1995)]. An increased sensitivity may be obtained by placing a ball lens between the two fiber segments or by creating a ball lens on the fiber edge. Integration of such optical sensors in micro-opto-electro-mechanical systems (MOEMS) can be achieved by replacing the optical fibers with dielectric waveguides.

Photonic crystal based displacement sensors are very uncommon. Suh et al in U.S. Patent Application No. 20040080726 disclose a PC displacement sensor that comprises a mechanically tunable photonic crystal structure consisting of coupled photonic crystal slabs. Simulations show that the transmission and reflection coefficients for light normally incident upon such structures can be highly sensitive to nano-scale variations in the spacing between the slabs. Moreover, by specifically configuring the photonic crystal structures, the high sensitivity can be preserved in spite of significant fabrication-related disorders.

Existing MOEMS sensors are limited in the sensitivity that they can provide, and may not be used in applications requiring detection of extremely small absolute displacements. Suh's sensor is not planar and cannot be fabricated on a single chip, a serious deficiency. It would therefore be advantageous to have very sensitive photonic crystal displacement sensors, fully integrable on a single chip.

Photonic crystal waveguides (PCWG) are known, but only in stationary (fixed) configurations. Methods for light coupling into and out of PCWG structures are also well known in the art. The problem of adiabatic coupling from an external light source is also well characterized [se e.g. Y. Xu, R. K. Lee, and A. Yariv, Optics Lett. 25, 755 (2000)].

SUMMARY OF THE INVENTION

The present invention is of a displacement sensor comprising at least one pair of co-planar photonic crystal waveguide (PCWG) sections aligned along or parallel to a common axis and separated by a gap, one PCWG section of a pair operative to perform a displacement relative to the other section of the pair. The sensor is referred to hereinafter simply as "PCWG sensor". In one embodiment, light coupled from one PCWG section into the other leaks into the gap, which itself has the properties of a "cross" PCWG, perpendicular to the first two. The amount of leaked energy and its distribution among a right and a left section (or "branch") of the cross PCWG depend on the relative displacement and may be measured at the exit of each PCWG section. In another embodiment, two pairs of segmented PCWGs are used in a Mach Zehnder Interferometer (MZI) configuration. The segments of each pair are separated by a gap with a width that changes according to a relative displacement of the segments. The displacement may be sensed through interferometry.

According to the present invention there is provided an optical displacement sensor comprising a first photonic crystal waveguide (PCWG), a second PCWG coplanar with and operative to perform a displacement relative to the first PCWG, and an optical detection mechanism operate to provide an optical measurement correlated with the relative displacement between the first and second PCWGs.

According to the present invention there is provided an optical displacement sensor comprising a first MZI PCWG segment, a second MZI PCWG segment coplanar with and operative to perform a displacement relative to the first MZI PCWG segment, and an optical detection mechanism operative to provide a measurement of the relative displacement between the first and second MZI PCWG segments.

According to the present invention there is provided optical displacement sensor comprising at least two co-planar photonic crystal waveguides (PCWG) separated by at least one air gap, the PCWGs operative to perform a relative displacement movement and an optical detection mechanism operative to provide a measurement of the relative displacement.

According to one feature in the optical displacement sensor of the present invention, the at least one air gap includes a cross air PCWG, and the optical detection mechanism is operative to provide a differential intensity reading between two edge outputs of the cross air PCWG.

According to another feature in the optical displacement sensor of the present invention, the at least two PCWGs include two pairs of PCWGs in a MZI configuration, the at least one air gap includes two air gaps positioned between a respective PCWG of one pair and a respective PCWG of the other pair, the relative displacement movement includes a decrease in the width of one gap and an equal increase in the width of the other gap, and the measurement is an interferometric MZI measurement correlated with the relative displacement.

According to the present invention there is provided a method for sensing mechanical displacements optically, comprising the steps of providing a first PCWG, providing a second PCWG coplanar with and operative to perform a displacement relative to the first PCWG, and performing an optical measurement correlated with the relative displacement between the first and second PCWGs, thereby obtaining a displacement value.

BRIEF DESCRIPTION OF THE DRAWINGS

For a better understanding of the present invention and to show more clearly how it could be applied, reference will now be made, by way of example only, to the accompanying drawings in which.

DETAILED DESCRIPTION OF THE INVENTION

Figure 1A:
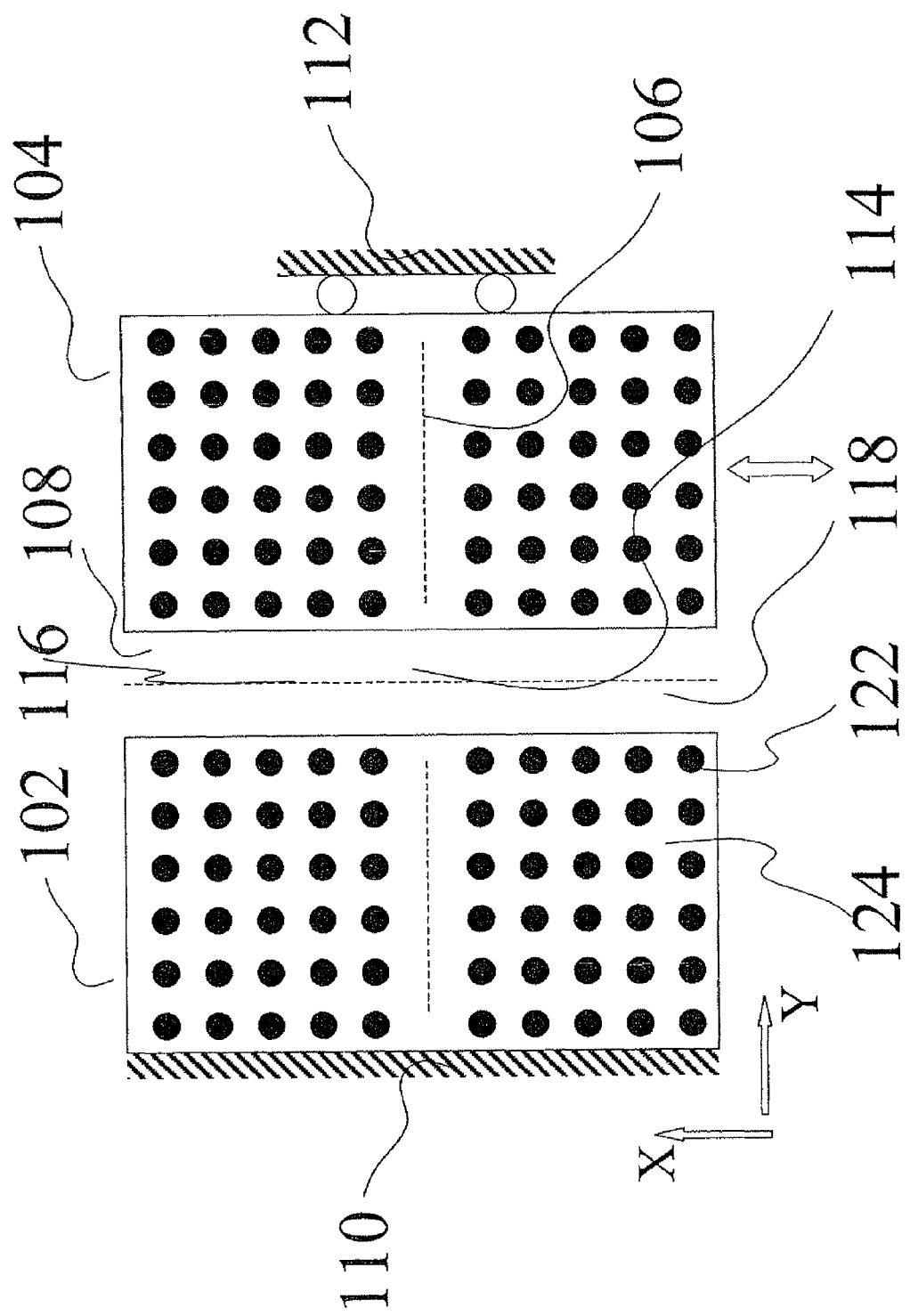
FIG. 1 shows schematically the layout of a PCWG displacement sensor of the present invention: (a) a sensor comprising two materials, and (b) a sensor comprising three materials.

FIG. 1a shows a preferred embodiment of a "linear" configuration PCWG sensor 100 of the present invention. The sensor includes two co-planar PCWG segments residing in a X-Y plane, a fixed segment 102 and a mobile segment 104, both parallel to an axis 106 (in the X direction) and separated by a physical gap 108. In principle, the PC may be any structure possessing a band gap in the frequency domain used for the light signal. The fixed PCWG is rigidly connected to a substrate 110 and the mobile PCWG is rigidly connected to a moving part (e.g. a suspended micro-electro-mechanical system (MEMS) mass) 112 operative to move in-plane perpendicular (in the Y direction) to axis 106. Moving and fixed MEMS elements and mechanisms for providing relative movements between co-planar MEMS elements are well known in the art. Gap 108 acts essentially as a "cross" air PCWG perpendicular to, and intersects axis 106 at an intersection 114, and will henceforth be referred to as "cross PCWG" 108. Cross PCWG 108 has a left branch (section) 116 and a right branch (section) 118. "Left" and "right" are defined with respect to an input light signal 120.

Figure 1B:
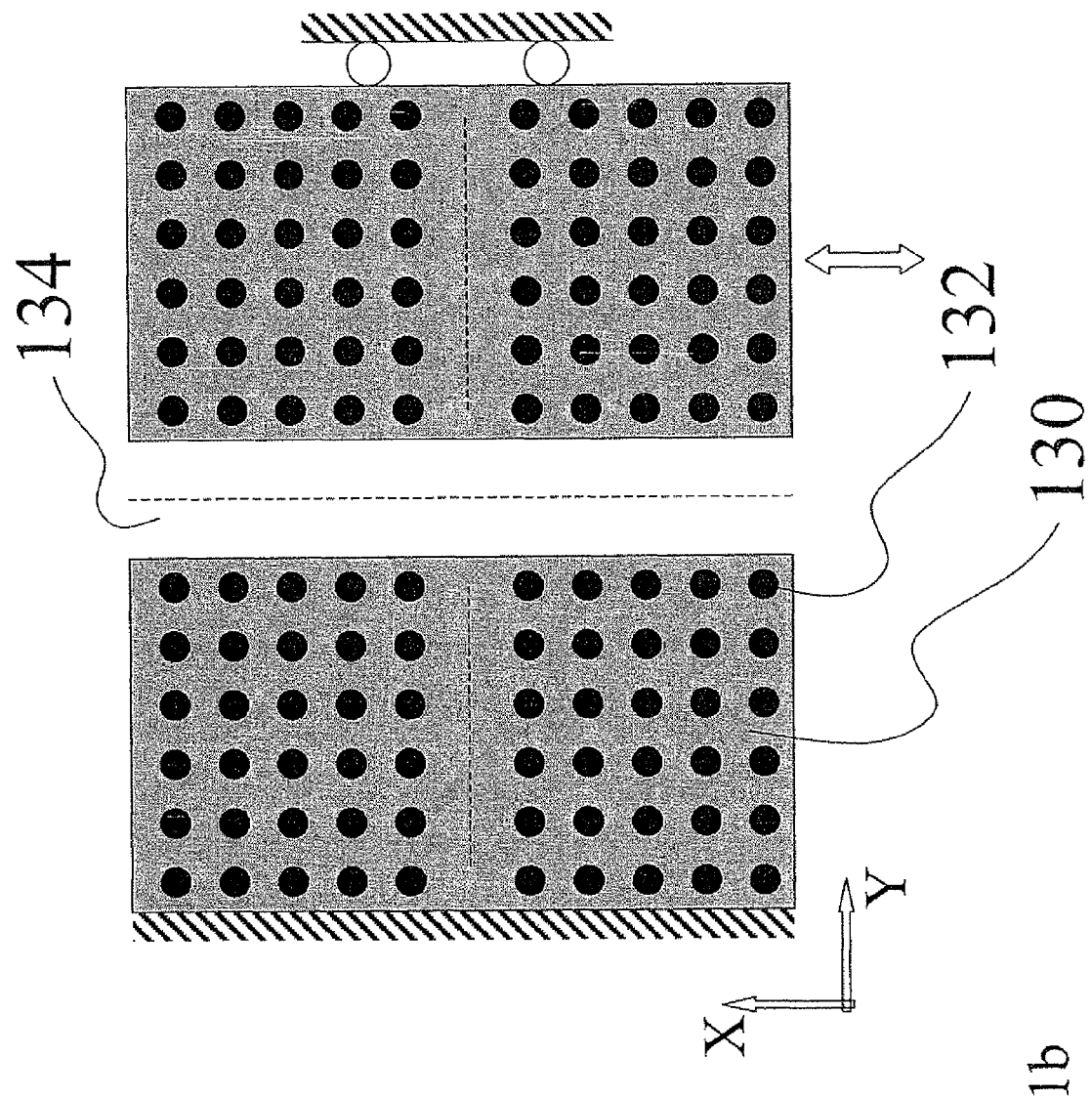

In the preferred embodiment shown in FIG. 1a, the PC comprises solid elements (e.g. posts) 122 of a first dielectric material surrounded by a second dielectric material (air gaps) 124 (see e.g. O. Levy et al., Appl. Phys. Lett., Vol. 86, 104102 (2005)). The waveguides comprise either a fully missing line of rods (also referred to as "W1-type waveguides") or selectively missing rods in what is known as a "coupled cavity waveguide" or CCW configuration (see e.g. U.S. Patent Application No. 20040021193 to Nathan et al). Cross PCWG 108 is an air PCWG. Alternatively, as shown in FIG. 1b, the PCWG sensor may be made of three materials, e.g, at least two different dielectric materials 130 and 132. In his case, the waveguide may be a missing line or be a CCW of either 130 or 132 elements. In yet other alternative configurations in which the PC comprises air rods in a solid dielectric matrix, the waveguide may be a line or CCW of missing air rods (full material).

Figure 2A:
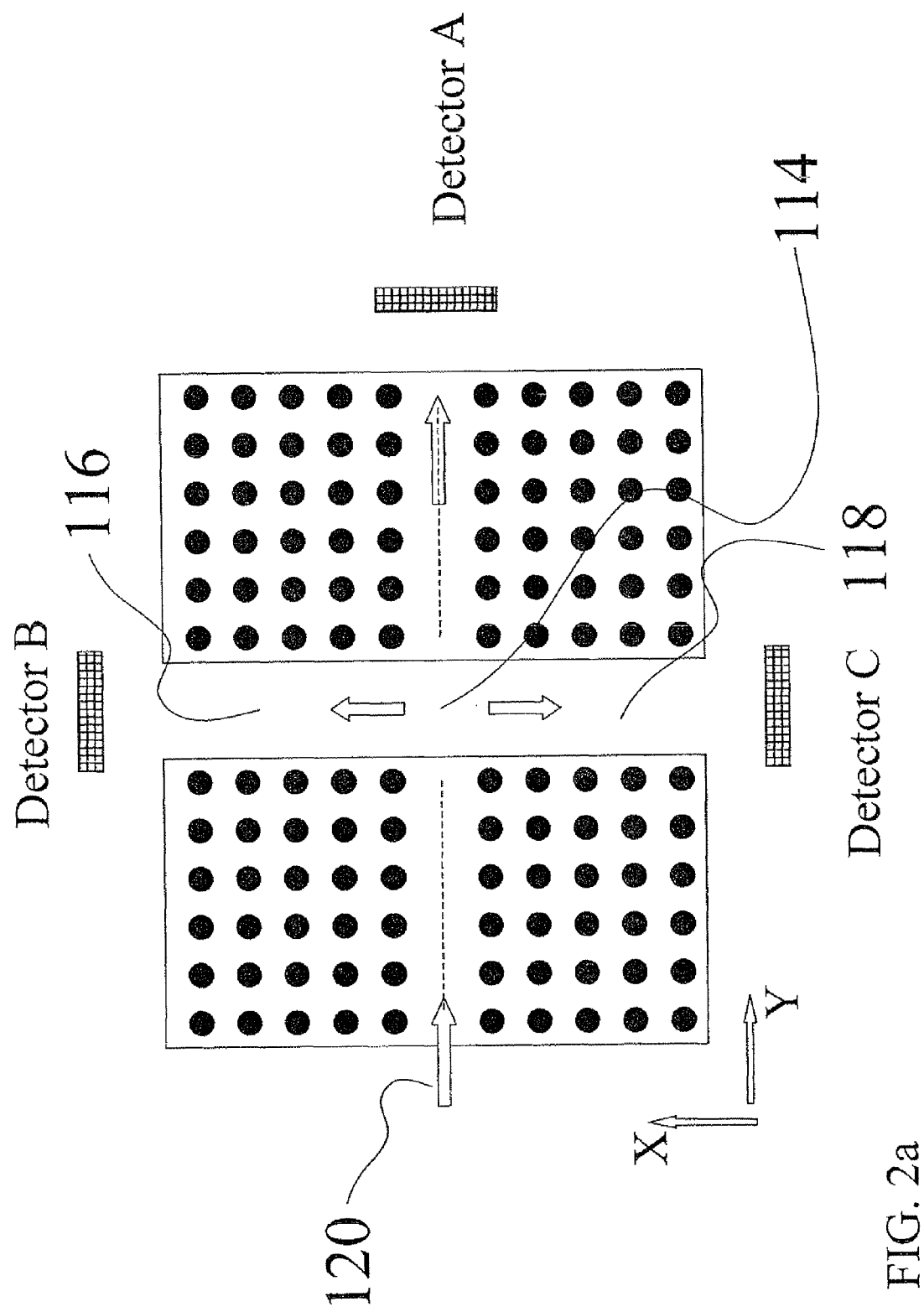
FIG. 2 shows schematically the PCWG sensor of FIG. 1 in a measurement setup: (a) under zero displacement and (b) after some displacement.
Figure 2B:
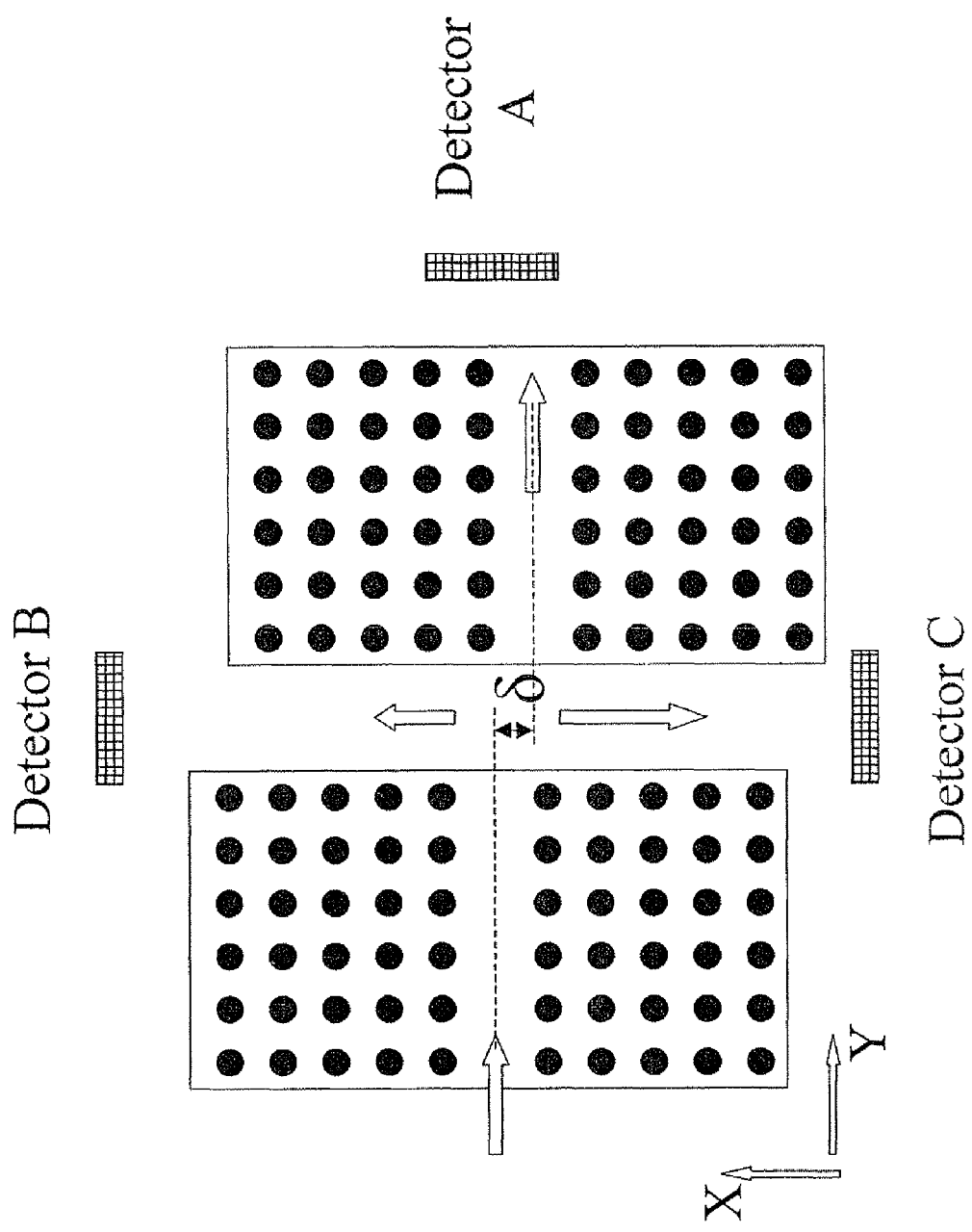

FIG. 2 shows schematically the PCWG sensor of FIG. 1 in a measurement setup: (a) under zero displacement and (b) after some displacement, i.e. a relative shift δ of axis 106 in segment 104 vs that in segment 102. As shown, PCWG segment 104 extends to the right toward a detector A positioned proximate to an output edge of segment 104. Left branch 116 extends upwards toward a detector B positioned proximate to an output edge of branch 116. Right branch 118 extends downward toward a detector C positioned proximate to an output edge of branch 118. As used herein, "a" detector does not necessarily represent a single detector but is meant to cover any detector arrangement including a plurality of detectors and detector arrays. In this embodiment, sensing is performed differentially by measuring changes in light intensity (energy) resulting from the relative displacement between the fixed and moving PCWGs. Energy exiting fixed PCWG segment 102 is divided at intersection 114, some continuing into moving segment 104 and some split between the left and right PCWG branches 116 and 118. The amount of energy exiting segment 104 and each of branches 116 and 118 (measured respectively by detectors A, B and C) depends on the displacement. A specific differential measurement includes the difference in energies measured by detectors B and C. In contrast with Suh's sensor, the PCWG sensor of the present invention is planar and can therefore be fabricated in integrated form on a single substrate, as shown next in FIG. 3.

Figure 3:
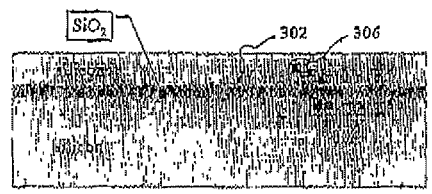
FIG. 3 shows in detail an exemplary process for fabrication of the PCWG sensor of FIG. 1.
Figure 3:
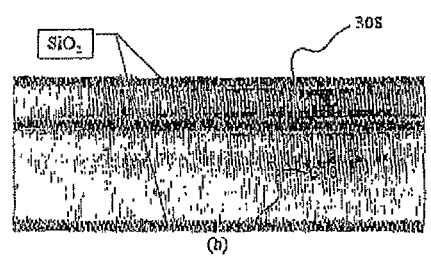
Figure 3:
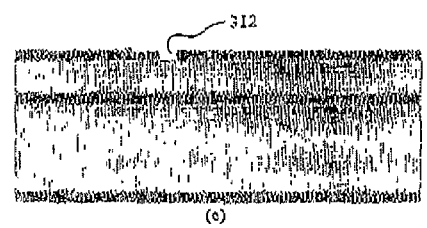
Figure 3:
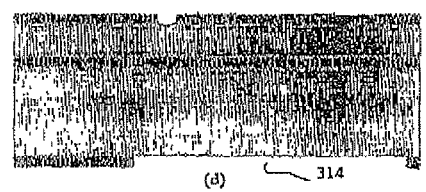
Figure 3:
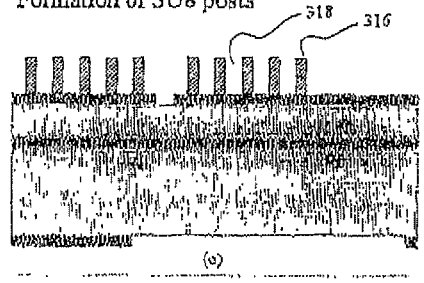
Figure 3:
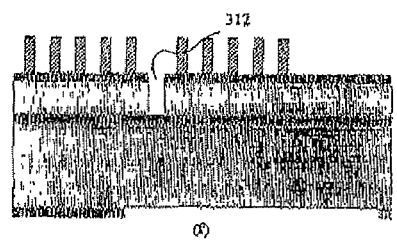
Figure 3:
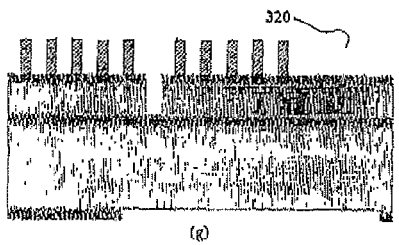
Figure 3:
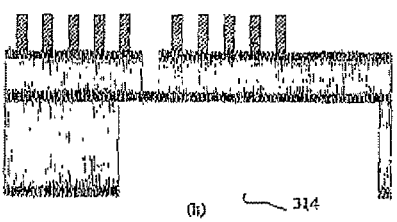
Figure 3:
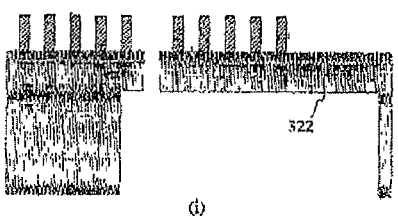
Figure 3:
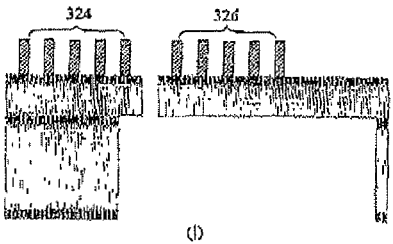
Figure 3:
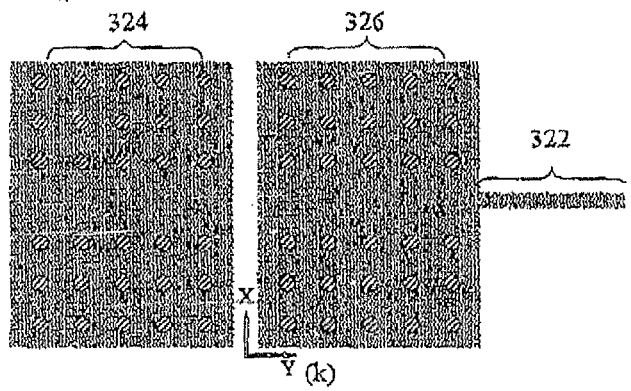
Figure 3:
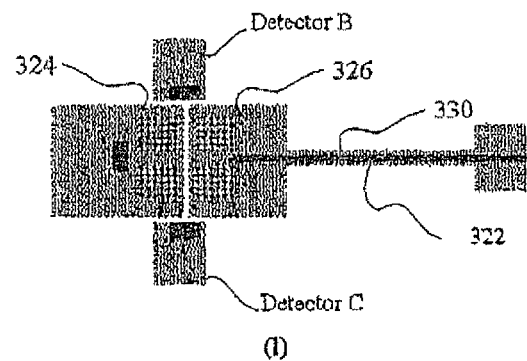

FIG. 3 shows in detail an exemplary process for fabrication of the PCWG sensor of FIG. 1. The PCWGs comprise SU8 (epoxy photoresist) posts surrounded by air gaps. The entire device is built on a silicon-on-insulator (SOI) substrate (a) comprising a device Si layer 302 separated from a thick Si handle material 304 by a buried $SiO_2$ layer 306. The layer thicknesses may be chosen according to the application. In (b), the substrate is oxidized to provide top and bottom $SiO_2$ layers 308 and 310. In (c), a first mask is used to photolithographically define and etch a cross PCWG opening 312 in top $SiO_2$ layer 308. In (d), a second mask is used to photolithographically define and etch a backside pattern 314 in bottom $SiO_2$ layer 310. In (e), an SU8 photosensitive epoxy layer is formed on top of the wafer using well known spinning and curing steps, and a third mask is used to photolithographically define and etch a PC structure of SU8 posts 316 surrounded by air gaps 318 on $SiO_2$ layer 308. In (f), opening 312 is used as a mask for etching Si device layer 302 down to buried oxide 306. In (g), a protective photoresist layer 320 is formed on the PC structure. In (h), backside pattern 314 is used as a mask for a backside etch of Si handle 304 up to buried oxide 306. In (i), the now unprotected (from the back) buried oxide layer is removed by a dry etch. Finally, in (j) the top protective layer 320 is removed in a cleaning step, leaving a fixed PCWG segment 322 and a "floating" PCWG segment 326 attached to a spring 322. FIG. 3(k) shows the structure in (j) from a top view. Segment 326 is now free to move laterally in the Y direction in the X-Y plane relative to segment 322. Light is coupled into the PCWG sensor from an external waveguide 330.

In yet another embodiment, the displacement sensor of the present invention may have a Mach Zehnder Interferometer (MZI) configuration, as shown in FIG. 4. Photonic crystal MZI waveguide devices are disclosed for example in U.S.

Figure 4A:
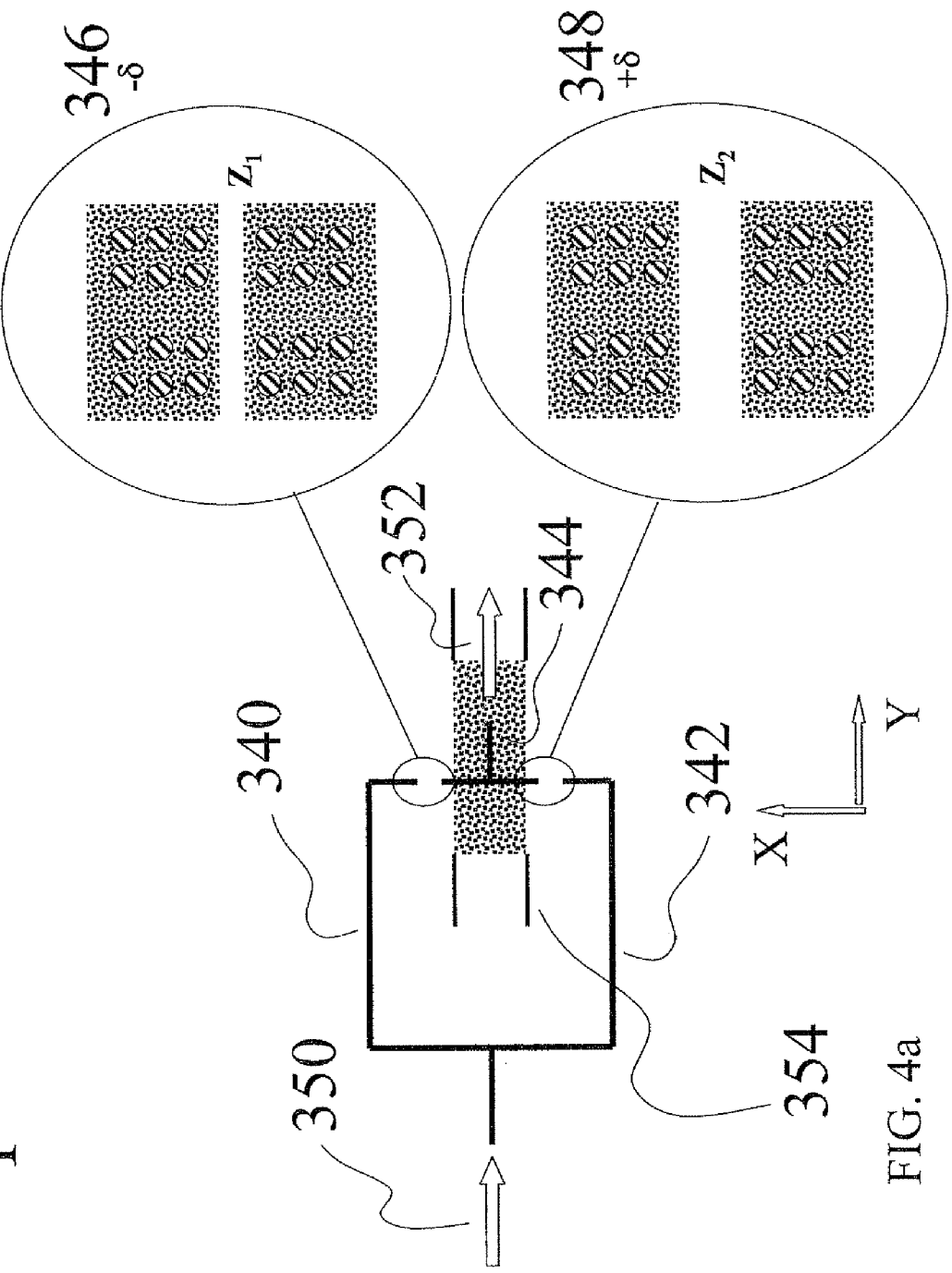
FIG. 4 shows schematically an embodiment of a PCWG displacement sensor of the present invention in a Mach Zehnder Interferometer (MZI) configuration.

Patent Application No 20040021193 to Nathan et al. FIG. 4a shows an embodiment in which a PC MZI comprises two arms 340 and 342 connected at one port that is operative to be coupled to a light beam 350 and to another port operative to emit a light beam 352. Arms 340 and 342 have respectively at least one gap 346 and 348, positioned in a section of the arm that is substantially parallel to a sensing direction (in this case the Y direction). A movable MZI section 344 is operative to move in the Y direction relative to a fixed MZI section 354, such that gap sizes $Z_1$ and $Z_2$ change by ±δ. The change in gap size affects the phase of light propagating through each MZI arm, and results in changes observable in an intensity pattern at an MZI port (e.g. in beam 352).

Figure 4B:
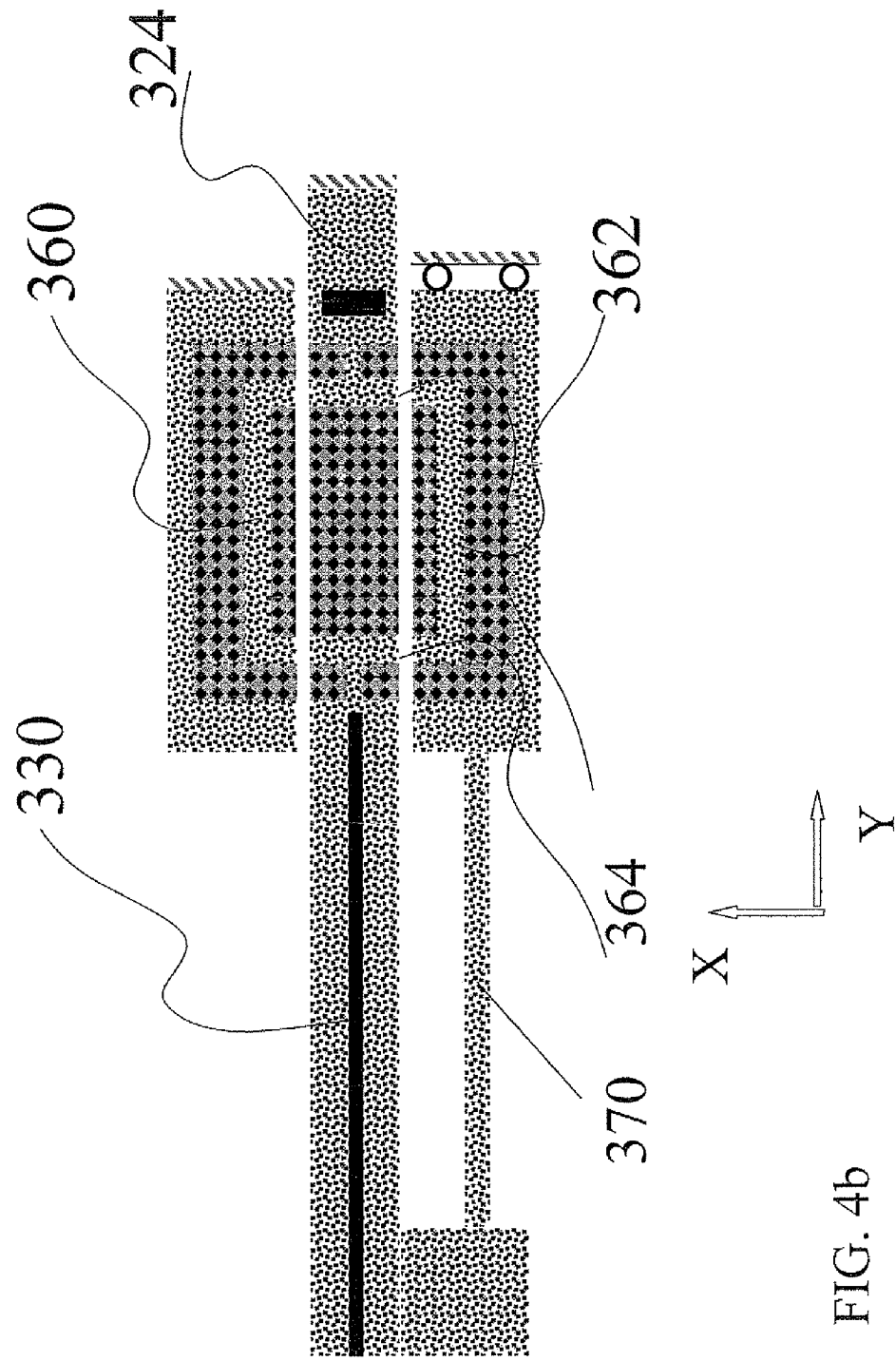

FIG. 4b shows another embodiment of a PC MZI displacement sensor of the present invention. In this embodiment, the sensor comprises a fixed arm 360 and a movable arm 362 separated by gaps 364. Optionally, for symmetry reasons, gaps may also be provided in the fixed arm. Section 362 is connected to a member 370 and operative to move in the Y direction, thereby causing to changes in the widths of gaps 364 and in the attendant light output.

The PCWG sensor has been described in terms of its function as a stand-alone sensor. However, a change in a light parameter as function of a displacement as described herein may be used for detecting acceleration and vibration, or in MEMS gyros, for example ring gyros. Such devices are at present based almost exclusively on capacitive detection in a "sensing" direction, i.e. have a parallel plate capacitor structure in which the distance between plates changes as function of acceleration, vibration or Corriolis force. Thus, optical sensing using a PCWG sensor of the present invention may replace capacitive sensing in any such device and application.

In general, any co-planar PCWG configuration that permits relative movement of at least one PCWG segment relative to at least one other PCWG segment so that a property (e.g. intensity or phase) of light passing through these segments changes in response to the relative in-plane displacement of these segments should be considered an integral part of; and covered by, the present invention. Moreover, the waveguides may be implemented in one-dimensional (1D) PCs [I. Jae-Soong et al, J. Lightwave Technol. 22, 509-513 (2004)], as 1D ridge PCWGs [S, Nishikawa et al., Optics Express, 27, 2079-2081 (2002)], two-dimensional (2D) PCs, 2D-in-1D hybrid PCWG structures [C. O. Cho et al., Current Appl. Phys. 4, 245-249 (2004)] or in three-dimensional (3D) PCs [Z. Y Li and K. M. Ho, Physical Review B 68 (24); Art. No. 245117 (2003)].

Note that the essential feature in all embodiments is the presence of at least two PC waveguide segments separated by a gap. In principle, this feature may appear in various planes, and provide sensing capability in one, two or three directions (e.g. X-Y-Z), simply by combinations of two or three such sensors.

EXAMPLE

Numerical Simulations

A numerical simulation of the field distribution inside a two-dimensional PC structure as in FIG. 1a and FIG. 3 is used to demonstrate the performance of our PCWG displacement sensor. We use a numerical code based on the Multifilament Current Model [Y. Leviatan and A. Boag, IEEE Trans. Antennas Prop. 35, 1119 (1987)] to find the energy distribution and intensity exiting each PCWG for different displacements. Dielectric posts 122 are assumed to be cylinders with diameter 1.2 μm and a relative dielectric constant $\in_r$=8.41, separated by air and positioned on a square periodic lattice with a unit cell of 4 μm by 4 μm. All waveguides are W1-type. The light used has a 9.02 μm wavelength which can be generated using a $CO_2$ laser, and which is within the bandgap of this PC structure. The numerical code computes the full solution of the propagation/scattering problem, based on the algorithm provided in Y. Leviatan and A. Boag, IEEE Trans. Antennas Prop. 35, 1119 (1987). We use it to compute the fields for displacements between 0 and 6 μm. Detectors A, B and C are placed 6 μm away from the respective PCWG output edges. The displacement is correlated with the electric field intensities, specifically with the difference $I_B-I_C$ of the intensities reaching respectively detectors B and C.

Figure 5:
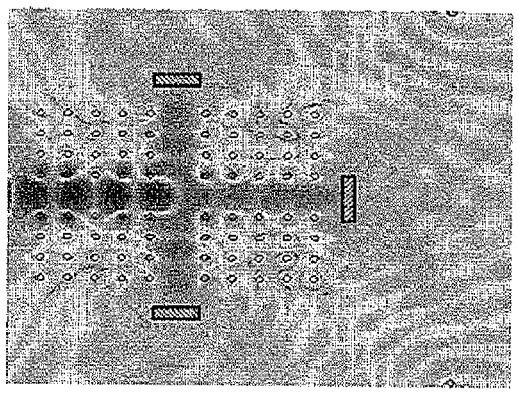
FIG. 5 shows the electric field distribution in a PCWG sensor without and with displacement: (a) no displacement, (b) 0.6 μm displacement and (c) 6 μm displacement.
Figure 5:
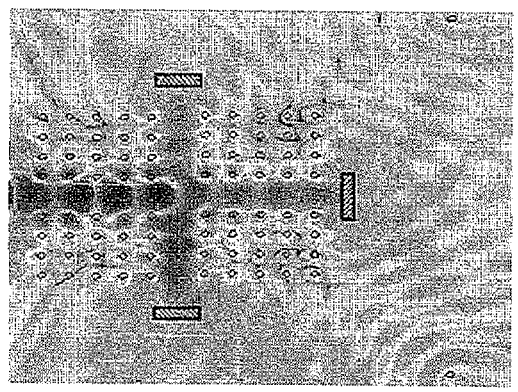
Figure 5:
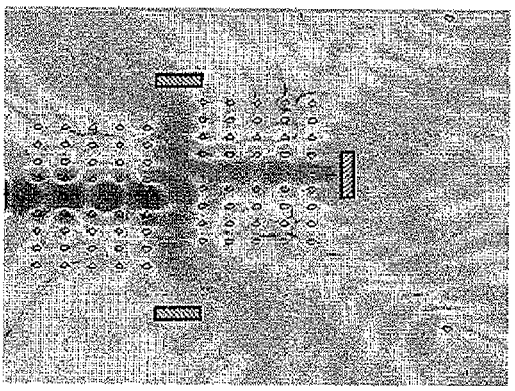
Figure 6:
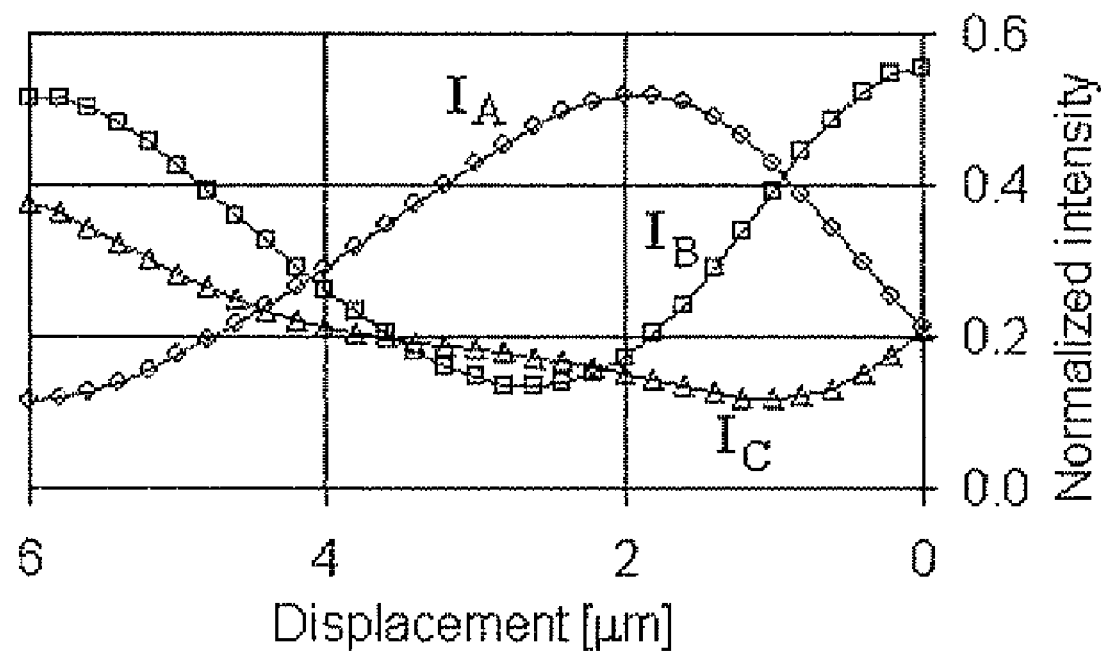
FIG. 6 shows the intensity detected as function of displacement for each detector.

FIG. 5 shows the electric field distribution for displacements of: (a) zero, (b) 0.6 μm, and (c) 6 μm. The light pattern and the intensities radiating from the waveguide output edges depend strongly on the displacement. FIG. 6 shows the intensities reaching each detector as a function of the displacement. Each graph is normalized to the total intensity exiting the device. That is, $I_A=I_A/(I_A+I_B+I_C)$, where the bold quantities are the actual electric field intensities ($E^2$) integrated along the detector surface. Similar relations hold for $I_B$ and $I_C$. The most interesting quantity is the differential intensity between branches B and C.

Figure 7:
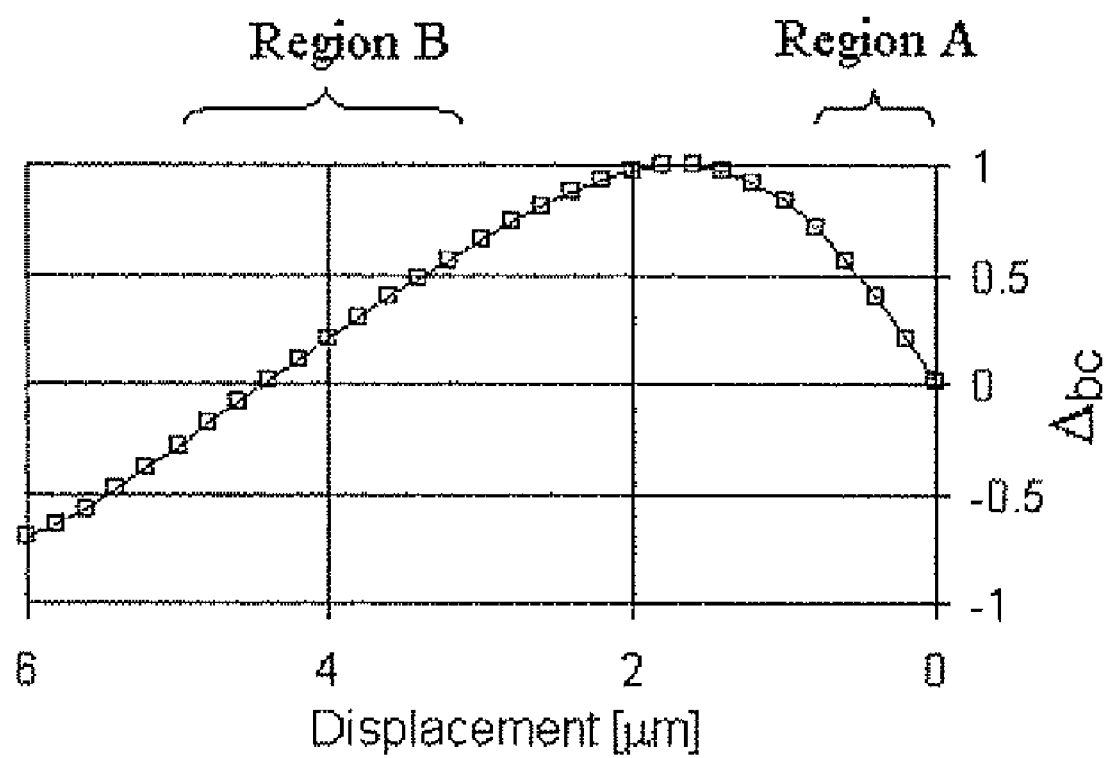
FIG. 7 shows the normalized intensity difference $\Delta_{BC}=(I_B-I_C)/\max[(I_B-I_C)]$ as function of displacement.

FIG. 7 shows the normalized difference $\Delta_{BC}=(I_B-I_C)/\max[(I_B-I_C)]$ as a function of the displacement, where max $[(I_B-I_C)]$ is the highest value over all displacements. We define sensitivity as the ratio between the normalized difference $\Delta_{BC}$. and the corresponding displacement. This ratio is equal to the curve slope in FIG. 8. One sees that there are two displacement ranges in which the sensitivity is high: region A (0-0.6 μm displacement) with a sensitivity of ~1[μm$^{-1}$] and region B (3-5 μm displacement) with a sensitivity of ~0.4 [μm$^{-1}$]. Region A (relatively small displacements) is the one of interest to us. In this region, small displacements have a profound effect on the waveguide junction (intersection) geometry and hence on the scattering effects that take place therein, while the waveguide output terminals are hardly affected by these small displacements. Therefore, $I_B-I_C$ and $\Delta_{BC}$ reflect differences in the power entering the left and right branches, i.e. are basically determined by the complex scattering effects that take place at the junction. For larger displacements, the intersection shape remains relatively unchanged, and the power reaching each detector is essentially a result of the intensity pattern of the field that radiates from the waveguide terminals.

It is clear that at least in region A, the linear PCWG sensor has excellent sensitivity to small displacements. The sensitivity of ~1[μm$^{-1}$] shown above is achieved using a PC structure designed for light signals with a wavelength of 9.02 μm. Similar structures for shorter wavelengths can easily be designed by performing a proper geometry downscale. The sensitivity will increase by a corresponding factor. For example, if the wavelength used is 1.5 μm, the sensitivity is predicted to increase by a factor of 6.

Figure 8:
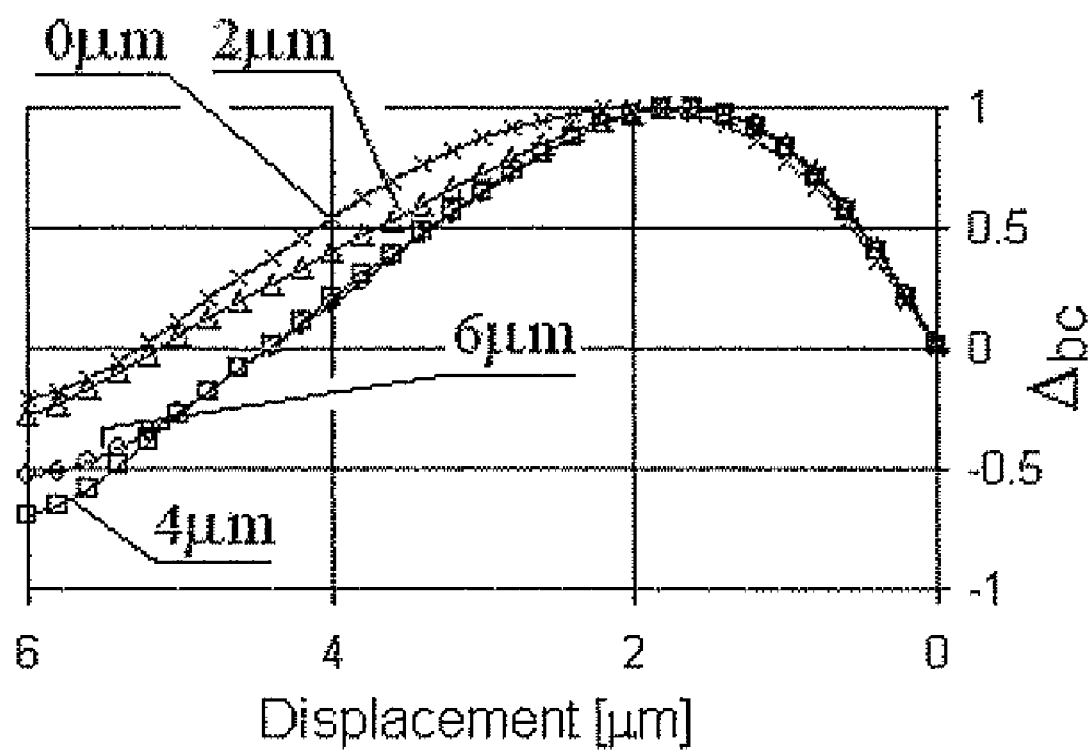
FIG. 8 shows the normalized intensity difference $\Delta_{BC}=(I_B-I_C)/\max[(I_B-I_C)]$ as function of displacement for several detector positions away from the PCWG edge.

The robustness of such a device in terms of fabrication and dimensional errors is an important factor in actual implementations. FIG. 8 shows results of simulations that check the effects of structural disorder on the device sensitivity in three different cases: (1) for detectors misplaced relative to the PCWG edges; (2) for a changed gap between the two PCWGs; and (3) for effects of random fabrication errors in the PC structure in the range of +/−0.075 μm. In (1), we checked the device sensitivity starting with the detectors aligned with the PCWG edge (zero distance) and then moved by 2 μm, 4 μm and 6 μm away of the PCWG edges. The effect of the detector location on the sensitivity in region A is very small compared to that in region B. This is so because the energy reaching detectors B and C is essentially due to differences in the power entering the left and right branches at the junction. In contrast, in region B, the energy reaching the detectors is determined by the intensity pattern of the field radiating out of the waveguide terminals.

Figure 9:
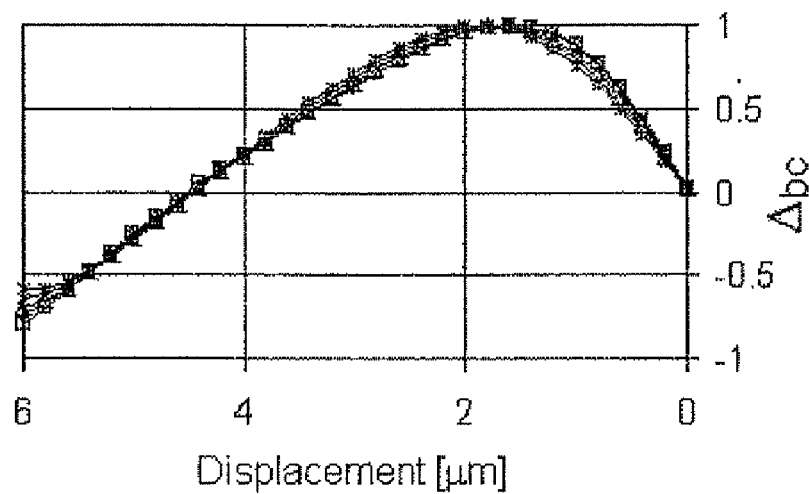
FIG. 9 shows the normalized intensity difference $\Delta_{BC}=(I_B-I_C)/\max[(I_B-I_C)]$ for different gaps between PCWGs.

The results shown so far were obtained with a waveguide width (and PCWG gap size) of 8 µm. We checked the device sensitivity to four other gap sizes: 7.6 µm, 7.8 µm, 8.2 µm and 8.4 µm. As shown in FIG. 9, the gap size change in the range of ±0.4 µm has a negligible effect on the sensitivity, and therefore on predicted sensor performance.

Figure 10:
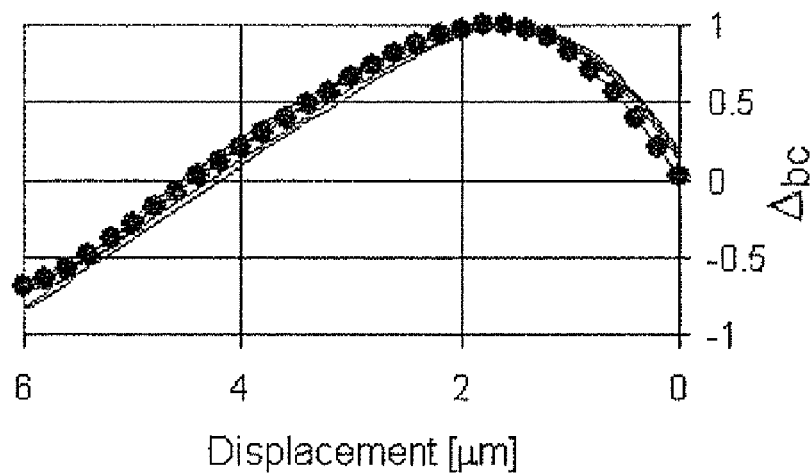
FIG. 10 shows the normalized intensity difference $\Delta_{BC}=(I_B-I_C)/\max[(I_B-I_C)]$ for a sensor with 0.075 μm error in post location and radius. The dotted line represents a structure with no errors.

The fabrication of the suggested PC structure may also involve errors in the location and radii of the posts. We performed several simulations with random errors of 0.075 µm (with random distribution) in these two parameters. As shown in FIG. 10, the intensity differences $I_B - I_C$ for several different error patterns show similar behavior to that of the error-free structure over the entire displacement range. In summary, the present invention discloses a highly sensitive, very robust displacement sensor based on photonic crystal waveguides.

All publications, patents and patent applications mentioned in this specification axe herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

While the invention has been described with respect to a limited number of embodiments, it will be appreciated that many variations, modifications and other applications of the invention may be made.

What is claimed is:

1. A displacement sensor comprising:
   a) a first photonic crystal waveguide (PCWG);
   b) a second PCWG coplanar with and operative to perform a displacement relative to the first PCWG, the first PCWG and the second PCWG having each a broad and flat surface and lying in the same plane such that their broad and flat surfaces are adjacent, wherein the displacement is measurable optically, and
   c) an optical detection mechanism for performing an optical measurement of the displacement, wherein the first PCWG and the second PCWG are included in one arm of a Mach-Zehnder interferometer.

2. A displacement sensor comprising:
   a) a first photonic crystal waveguide (PCWG);
   b) a second PCWG coplanar with and operative to perform a displacement relative to the first PCWG, the first PCWG and the second PCWG having each a broad and flat surface and lying in the same plane such that their broad and flat surfaces are adjacent, wherein the displacement is measurable optically, and
   c) an optical detection mechanism for performing an optical measurement of the displacement, wherein the first PCWG and the second PCWG are included in each of a first arm and of a second arm of a Mach-Zehnder interferometer (MZI), wherein the first PCWG and the second PCWG included in the first MZI arm are operative to perform a first displacement therebetween and wherein the first PCWG and the second PCWG included in the second MZI arm are operative to perform a second displacement therebetween.

3. The displacement sensor of claim 2, wherein the first and second displacements are not equal.

4. The displacement sensor of claim 2, wherein the first and second displacements are not in the same direction.

5. A method for optically sensing a displacement, comprising the steps of:
   a) providing a first photonic crystal waveguide (PCWG);
   b) providing a second PCWG coplanar with and operative to perform a displacement relative to the first PCWG, the first PCWG and the second PCWG having each a broad and flat surface and lying in the same plane such that their broad and flat surfaces are adjacent; and
   c) performing an optical measurement correlated with the relative displacement between the first PCWG and the second PCWG;
wherein the first PCWG and the second PCWG are included in one arm of a Mach-Zehnder interferometer (MZI) and wherein the step of performing an optical measurement includes performing an interferometry measurement.

6. A method for optically sensing a displacement, comprising the steps of:
   a) providing a first photonic crystal waveguide (PCWG);
   b) providing a second PCWG coplanar with and operative to perform a displacement relative to the first PCWG, the first PCWG and the second PCWG having each a broad and flat surface and lying in the same plane such that their broad and flat surfaces are adjacent; and
   c) performing an optical measurement correlated with the relative displacement between the first PCWG and the second PCWG;
wherein the first PCWG and the second PCWG are included in each of a first arm and of a second arm of a Mach-Zehnder interferometer (MZI), wherein the first PCWG and the second PCWG included in the first MZI arm are operative to perform a first displacement therebetween, wherein the first PCWG and the second PCWG included in the second MZI arm are operative to perform a second displacement therebetween and wherein the step of performing an optical measurement includes performing an interferometry measurement.

7. The method of claim 6, wherein the first and second displacements are not equal.

8. The method of claim 6, wherein the first and second displacements are not in the same direction.

* * * * *